United States Patent
Kang et al.

(10) Patent No.: US 11,694,843 B2
(45) Date of Patent: Jul. 4, 2023

(54) MULTILAYER CAPACITOR AND METHOD OF MANUFACTURING THE SAME

(71) Applicant: SAMSUNG ELECTRO-MECHANICS CO., LTD., Suwon-si (KR)

(72) Inventors: Yun Sung Kang, Suwon-si (KR); Min Jung Cho, Suwon-si (KR); Yun Hee Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 132 days.

(21) Appl. No.: 17/320,966

(22) Filed: May 14, 2021

(65) Prior Publication Data

US 2022/0139616 A1 May 5, 2022

(30) Foreign Application Priority Data

Nov. 4, 2020 (KR) .......................... 10-2020-0146115

(51) Int. Cl.
*H01G 4/30* (2006.01)
*H01G 4/248* (2006.01)
*H01G 4/008* (2006.01)

(52) U.S. Cl.
CPC ........... *H01G 4/0085* (2013.01); *H01G 4/248* (2013.01); *H01G 4/30* (2013.01)

(58) Field of Classification Search
CPC .......... H01G 4/30; H01G 4/008; H01G 4/012; H01G 4/248
See application file for complete search history.

(56) References Cited

U.S. PATENT DOCUMENTS

| | | | | |
|---|---|---|---|---|
| 5,339,068 A * | 8/1994 | Tsunoda | ................ | H01C 1/142 338/308 |
| 8,058,968 B2 * | 11/2011 | Hirano | ................ | H01C 17/006 338/332 |
| 9,370,102 B2 * | 6/2016 | Lee | ...................... | H01G 4/2325 |
| 9,959,973 B2 * | 5/2018 | Saito | ....................... | H01G 4/30 |
| 10,366,834 B1 * | 7/2019 | Lee | ......................... | H01G 4/248 |
| 10,475,581 B2 * | 11/2019 | Kaneda | ............... | C22C 32/0026 |
| 10,553,359 B1 * | 2/2020 | Park | ...................... | H01G 4/005 |
| 10,770,232 B2 * | 9/2020 | Han | ...................... | H01G 4/232 |
| 11,183,332 B2 * | 11/2021 | Kim | ...................... | H01G 4/224 |
| 11,302,480 B2 * | 4/2022 | Takahashi | ........... | H01G 4/2325 |
| 11,476,049 B2 * | 10/2022 | Sakurai | .................. | H01G 4/012 |

(Continued)

FOREIGN PATENT DOCUMENTS

KR 10-2019-0038237 A 4/2019
KR 10-2019-0038249 A 4/2019

*Primary Examiner* — Dion R. Ferguson
(74) *Attorney, Agent, or Firm* — Morgan, Lewis & Bockius LLP

(57) ABSTRACT

A multilayer capacitor includes a body including a stack structure in which a plurality of dielectric layers are stacked and a plurality of internal electrodes stacked with respective dielectric layers interposed therebetween, external electrodes disposed on external surfaces of the body and connected to the internal electrodes, and an insulating layer covering a surface of the body. One of the external electrodes includes a metal layer connected to the insulating layer, and the insulating layer includes an oxide of a metal component of the metal layer.

32 Claims, 6 Drawing Sheets

(56) References Cited

U.S. PATENT DOCUMENTS

| | | | |
|---|---|---|---|
| 2007/0109718 A1* | 5/2007 | Horie | H01G 4/30 361/306.3 |
| 2009/0290284 A1* | 11/2009 | Gabler | H01G 4/2325 361/321.1 |
| 2009/0323253 A1* | 12/2009 | Kobayashi | H01G 4/005 427/79 |
| 2010/0157507 A1* | 6/2010 | Matsumoto | H01G 4/30 361/306.3 |
| 2010/0290172 A1* | 11/2010 | Motoki | H01G 4/2325 427/79 |
| 2011/0170227 A1* | 7/2011 | Schmid | H05K 1/162 174/257 |
| 2012/0313489 A1* | 12/2012 | Shirakawa | H01G 4/012 336/200 |
| 2013/0299215 A1* | 11/2013 | Taseda | H01G 4/2325 174/255 |
| 2014/0125194 A1* | 5/2014 | Lee | H01L 41/0472 336/200 |
| 2014/0182907 A1* | 7/2014 | Lee | H01G 4/232 174/258 |
| 2015/0053472 A1* | 2/2015 | Lee | H01G 4/232 361/301.4 |
| 2016/0086733 A1* | 3/2016 | Saito | H01G 4/1227 205/183 |
| 2017/0260046 A1* | 9/2017 | Hwang | H05K 3/3442 |
| 2018/0108479 A1* | 4/2018 | Sato | H01G 2/06 |
| 2019/0103224 A1* | 4/2019 | Han | H01G 4/2325 |
| 2019/0103225 A1 | 4/2019 | Han et al. | |
| 2019/0189348 A1* | 6/2019 | Choi | H01G 4/224 |
| 2019/0355520 A1* | 11/2019 | Nakamura | H01G 4/1227 |
| 2019/0371525 A1* | 12/2019 | Zaima | H01G 4/232 |
| 2021/0005384 A1* | 1/2021 | Lee | H01G 4/2325 |
| 2021/0012964 A1* | 1/2021 | Lee | H01G 4/232 |
| 2021/0012965 A1* | 1/2021 | Lee | H01G 4/30 |
| 2021/0065986 A1* | 3/2021 | Kim | H01G 4/1218 |
| 2021/0065988 A1* | 3/2021 | Kim | H01G 4/252 |
| 2021/0082622 A1* | 3/2021 | Kim | H01G 4/232 |
| 2021/0193391 A1* | 6/2021 | Yi | H01G 4/012 |
| 2021/0375549 A1* | 12/2021 | Okada | H01G 4/012 |
| 2021/0375550 A1* | 12/2021 | Yatagawa | H01G 4/1227 |
| 2022/0139616 A1* | 5/2022 | Kang | H01G 4/248 361/301.4 |

* cited by examiner

I-I'

II-II'

MULTILAYER CAPACITOR AND METHOD OF MANUFACTURING THE SAME

CROSS-REFERENCE TO RELATED APPLICATION(S)

This application claims benefit of priority to Korean Patent Application No. 10-2020-0146115 filed on Nov. 4, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is an element that may store electricity therein, and generally uses a principle in which the electricity is accumulated in two electrodes when a voltage is applied to the capacitor in a state in which the two electrodes are disposed to face each other. When a direct current (DC) voltage is applied to the capacitor, a current flows in the capacitor while the electricity is accumulated in the capacitor, but when the accumulation of the electricity is completed, the current does not flow in the capacitor. Meanwhile, when an alternating current (AC) voltage is applied to the capacitor, an AC current flows in the capacitor while polarities of the electrodes are alternated.

Such a capacitor may be divided into several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which ceramic having a high dielectric constant is used in a multilayer structure as a dielectric material provided between electrodes, a film capacitor in which a polystyrene film is used as a dielectric material provided between electrodes, and the like, depending on a type of insulator provided between electrodes.

Among them, the multilayer ceramic capacitor has been recently used mainly in various fields such as a high frequency circuit since it has excellent temperature characteristics and frequency characteristics and may be implemented to have a small size. Recently, an attempt to implement the multilayer ceramic capacitor in a smaller size has been continuously conducted. To this end, dielectric layers and internal electrodes have been formed at smaller thicknesses.

Recently, in the field of the multilayer capacitor, many attempts to improve moisture resistance reliability of the multilayer capacitor by decreasing a defect due to permeation of moisture, a plating solution or the like, have been conducted. There is provided a method of forming a cover layer of a capacitor body or an external electrode at a large thickness as one such attempt. However, in this case, there is a problem that a size of the multilayer capacitor increases and capacitance of the multilayer capacitor decreases at the same size.

SUMMARY

An aspect of the present disclosure may provide a multilayer capacitor of which moisture resistance reliability is improved.

According to an aspect of the present disclosure, a multilayer capacitor may include: a body including a stack structure in which a plurality of dielectric layers are stacked and a plurality of internal electrodes are stacked with respective dielectric layers interposed therebetween, external electrodes disposed on external surfaces of the body and connected to the internal electrodes, and an insulating layer covering a surface of the body. One of the external electrodes may include a metal layer connected to the insulating layer, and the insulating layer includes an oxide of a metal component of the metal layer.

The metal layer may cover the surface of the body, and have a side surface connected to a side surface of the insulating layer.

The one of the external electrodes may further include an electrode layer covering the metal layer.

The metal component of the metal layer and a metal component of the electrode layer may form an intermetallic compound layer.

The electrode layer may include a sintered electrode.

The electrode layer may include a conductive resin electrode.

The metal layer and the insulating layer may have the same thickness.

A thickness of the insulating layer may be 5 nm to 1 µm.

The one of the external electrodes may further include an electrode layer disposed between the metal layer and the body.

The electrode layer may be thicker than the insulating layer.

A portion of the metal layer may be disposed between a side surface of the electrode layer and the insulating layer.

The metal layer may cover a surface of the electrode layer and be bent along the surface of the electrode layer to be connected to the insulating layer.

The one of the external electrodes may further include an additional electrode layer covering the metal layer.

The additional electrode layer may include a sintered electrode.

The additional electrode layer may be a conductive resin electrode.

The electrode layer may include a sintered electrode.

The metal layer may include a material selected from the group consisting of Ti, Al, V, Y, Zr, Nb, Hf, and Ta.

The insulating layer may be also disposed in a groove in the surface of the body.

According to an aspect of the present disclosure, a multilayer capacitor may include: a body including dielectric layers and internal electrodes alternately stacked; an external electrode disposed on an external surface of the body and connected to one or more of the internal electrodes; and an insulating layer covering a surface of the body. The external electrode may include a conductive layer, and the insulating layer may include an oxide of a metal component included in the conductive layer.

The external electrode may further include an electrode layer covering the conductive layer, and the insulating layer may be exposed from the electrode layer.

The body may be in contact with the conductive layer and the insulating layer.

The metal component of the conductive layer and a metal component of the electrode layer may form an intermetallic compound layer.

The electrode layer may include one of a sintered electrode and a conductive resin electrode.

The external electrode may further include an electrode layer disposed between the conductive layer and the body.

The external electrode may further include an additional electrode layer covering the conductive layer.

The additional electrode layer may include one of a sintered electrode and a conductive resin electrode.

The conductive layer may include a material selected from the group consisting of Ti, Al, V, Y, Zr, Nb, Hf, and Ta.

According to an aspect of the present disclosure, a method of manufacturing a multilayer capacitor may include: forming a body including dielectric layers and internal electrodes alternately stacked; forming a metal layer covering a surface of the body; forming an electrode layer on a portion of the metal layer to cover one or more ends of the internal electrodes; and forming an insulating layer by oxidizing another portion of the metal layer exposed from the electrode layer. The multilayer capacitor may include the insulating layer.

The metal layer may be formed by an atomic layer deposition (ALD) process.

The another portion of the metal layer exposed from the electrode layer may be formed directly on the body.

The portion of the metal layer covered by the electrode layer may be formed directly on the body.

The method may further include forming another electrode layer to connect to the one or more ends of the internal electrodes, prior to forming the metal layer. The portion of the metal layer covered by the electrode layer may be disposed between the another electrode layer and the electrode layer.

The metal layer may include a material selected from the group consisting of Ti, Al, V, Y, Zr, Nb, Hf, and Ta.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
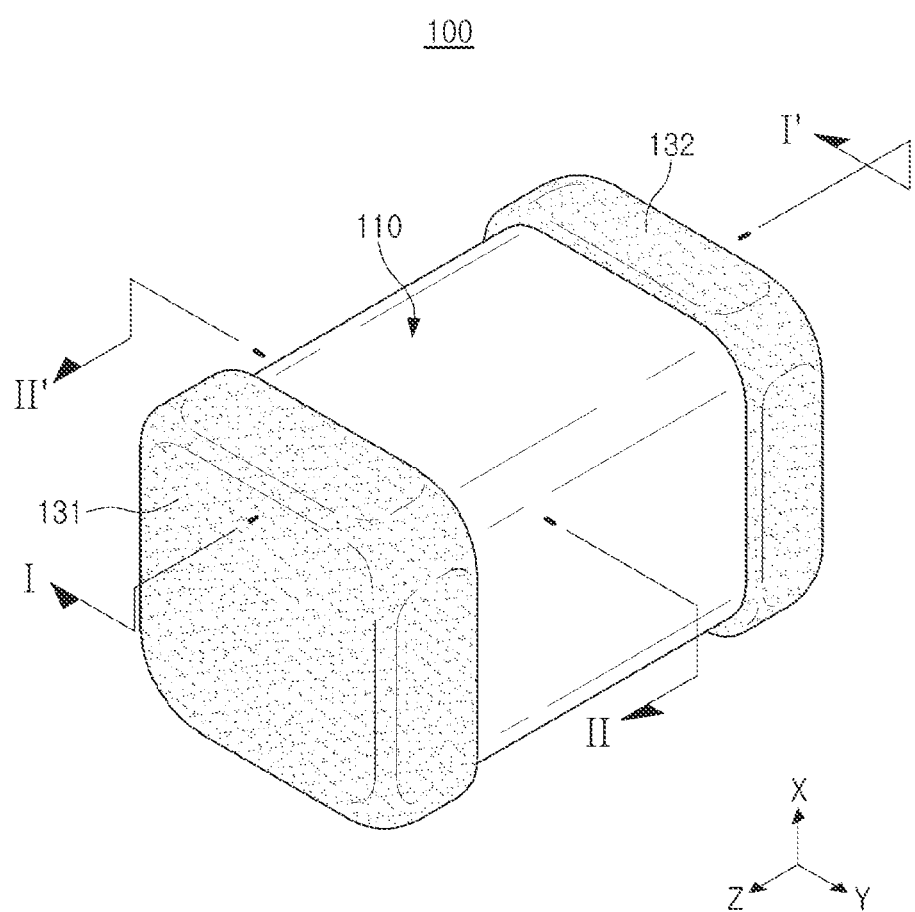
FIG. 1 is a schematic perspective view illustrating an appearance of a multilayer capacitor according to an exemplary embodiment in the present disclosure.
Figure 2:
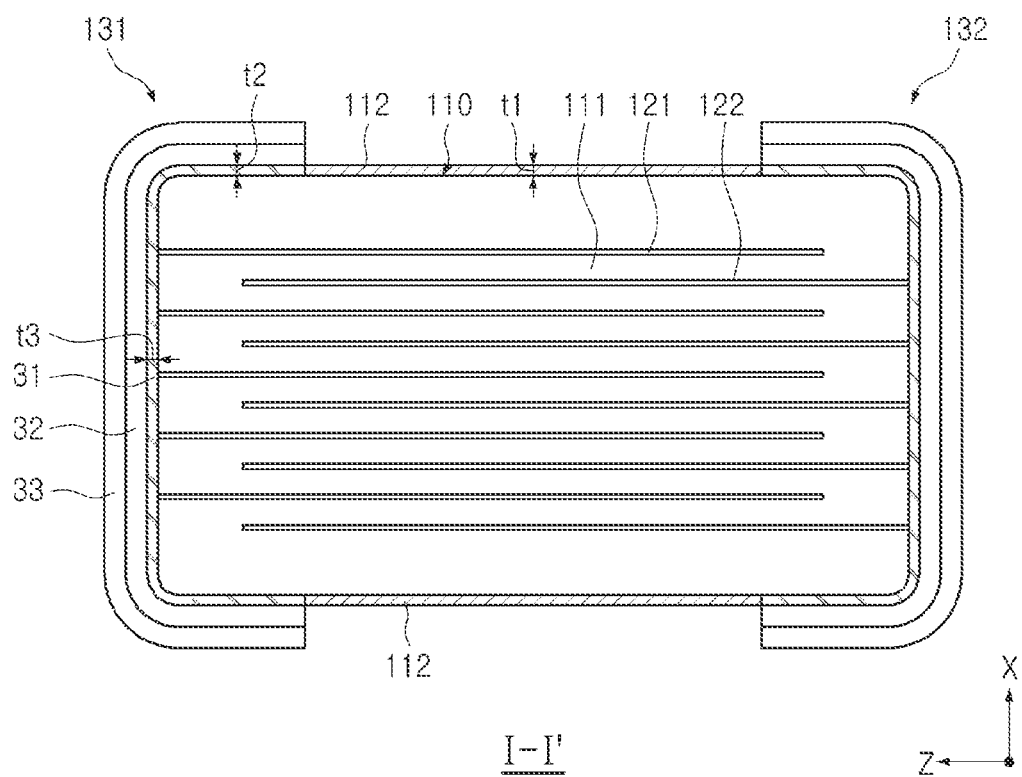
FIG. 2 is a cross-sectional view taken along line I-I' of the multilayer capacitor of FIG. 1.

FIG. 1 is a schematic perspective view illustrating an appearance of a multilayer capacitor according to an exemplary embodiment in the present disclosure. FIG. 2 is a cross-sectional view taken along line I-I' of the multilayer capacitor of FIG. 1. In addition, FIG. 3 is a cross-sectional view taken along line II-II' of the multilayer capacitor of FIG. 1.

Figure 3:
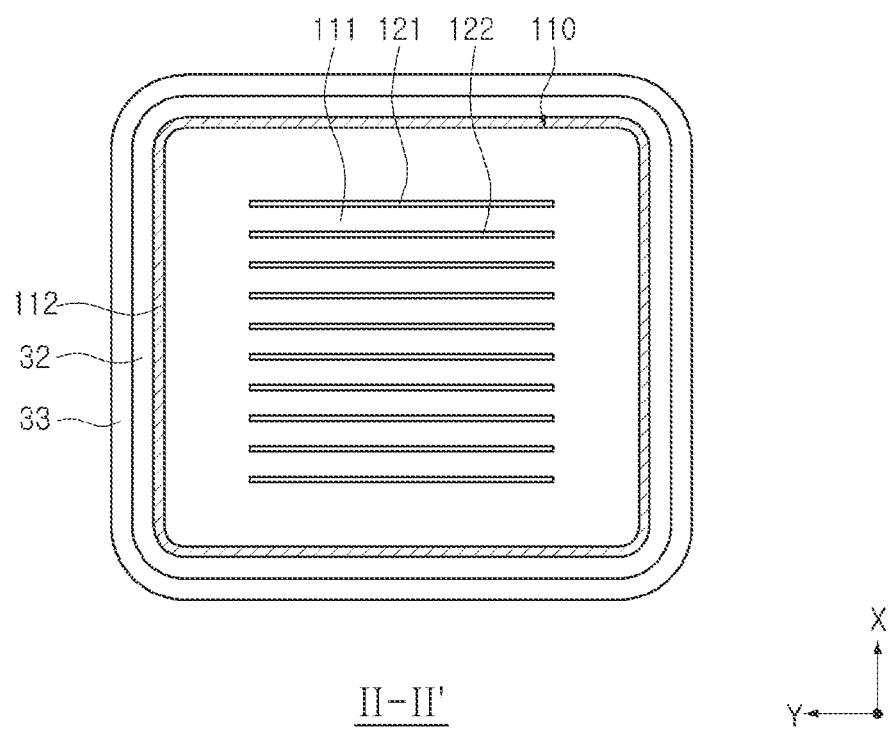
FIG. 3 is a cross-sectional view taken along line II-II' of the multilayer capacitor of FIG. 1.

Referring to FIGS. 1 through 3, a multilayer capacitor 100 according to an exemplary embodiment in the present disclosure may include a body 110 including dielectric layers 111 and a plurality of internal electrodes 121 and 122 stacked with respective dielectric layers 111 interposed therebetween, external electrodes 131 and 132, and an insulating layer 112 covering a surface of the body 110. The insulating layer 112 may be used in order to protect an inner portion of the body 110, particularly, the internal electrode layers 121 and 122, from a plating solution, moisture or the like. In addition, the insulating layer 112 may include an oxide of a metal component of a metal layer 31 of components included in the external electrodes 131 and 132.

The body 110 may include a plurality of dielectric layers 111, and may be obtained, for example, by stacking and then sintering a plurality of ceramic green sheets. The plurality of dielectric layers 111 may have a form in which they are integrated with each other by such a sintering process. In addition, as illustrated in FIG. 1, the body 110 may have a shape similar to a rectangular parallelepiped shape. The dielectric layer 111 included in the body 110 may include a ceramic material having a high dielectric constant, for example, a BT-based ceramic material, that is, a barium titanate ($BaTiO_3$)-based ceramic material, but may include another material known in the related art as long as sufficient capacitance may be obtained. The dielectric layer 111 may further include additives, organic solvents, plasticizers, binders, dispersants, and the like, if necessary, together with the ceramic material, which is a main component. Here, the additives may be added in a metal oxide form in a manufacturing process. An example of such metal oxide additives may include at least one of $MnO_2$, $Dy_2O_3$, BaO, MgO, $Al_2O_3$, $SiO_2$, $Cr_2O_3$, and $CaCO_3$.

Each of the plurality of internal electrodes 121 and 122 may be obtained by printing and then sintering a paste including a conductive metal at a predetermined thickness on one surface of the ceramic green sheet. In this case, the plurality of internal electrodes 121 and 122 may include first and second internal electrodes 121 and 122 exposed to surfaces of the body 110 opposing each other in a Z direction. In this case, the first and second internal electrodes 121 and 122 may be connected to different external electrodes 131 and 132, respectively, to have different polarities when the multilayer capacitor is driven, and may be electrically separated from each other by respective dielectric layers 111 disposed therebetween. However, according to another exemplary embodiment, the number of external electrodes 131 and 132 and a connection manner between the external electrodes 131 and 132 and the internal electrodes 121 and 122 may be changed. Examples of a main material constituting the internal electrodes 121 and 122 may include nickel (Ni), palladium (Pd), silver (Ag), copper (Cu), or the like, or alloys thereof.

The external electrodes 131 and 132 may include first and second external electrodes 131 and 132 formed on external surfaces of the body 110 and connected, respectively, to the first and second internal electrodes 121 and 122. The external electrodes 131 and 132 may include a metal layer 31. As illustrated in FIG. 2, the metal layer 31 may be connected to the insulating layer 112. More specifically, the metal layer 31 may be a conductive layer and cover the surface of the body 110, and have a side surface to which the insulating layer 112 is connected. The metal layer 31 may include a metal component such as Ti, Al, V, Y, Zr, Nb, Hf, or Ta, and an oxide of such a metal component may be included in the insulating layer 112. A connection structure between the metal layer 31 and the insulating layer 112, a form in which the metal oxide of the metal layer 31 is included in the insulating layer 112 may be obtained by forming the metal layer 31 over the entire surface of the body 110 and then oxidizing a partial region of the metal layer 31 to form the insulating layer 112 having a thin and compact form, as described later. From such a viewpoint, the metal component of the metal layer 31 may be determined in consideration of ease of oxidation, a possibility of implementing a thin film at the time of forming an oxide film, a compactness, stability, and the like, in addition to electrical conductivity, and Ti may be a representative example of a valve metal. When the metal layer 31 includes Ti, the insulating layer 112 may include $TiO_2$.

The metal layer 31 and the insulating layer 121 may be implemented to be relatively thin and compact. Since the insulating layer 121 having a form in which the metal component of the metal layer 31 is oxidized as in the present exemplar embodiment has a compact form even at a very small thickness, moisture resistance performance of the multilayer capacitor may be excellent and an increase in a size of the multilayer capacitor at the time of forming a protective structure for improving moisture resistance reliability may be significantly suppressed. For example, a thickness t1 of the insulating layer 121 may be 5 nm to 1 μm, and more preferably, 5 to 100 nm. In this case, the thickness t1 of the insulating layer 121 may be an average thickness, and may be obtained by averaging values measured at a plurality of points (for example, ten points) selected at regular intervals. When it is difficult to obtain the average thickness, a thickness of the insulating layer 121 measured at the center of the insulating layer 121 or a maximum thickness of the insulating layer 121 may be determined as the thickness t1 of the insulating layer 121. The measurement may be performed at a cross-section of the body 110, for example, a cross-section corresponding to the view shown in FIG. 2 or FIG. 3. In one example, the cross-section may be a cross-section in the X-Z plane at a center of the body 110 in the Y direction, and in another example, the cross-section may be a cross-section in the X-Y plane at a center of the body 110 in the Z direction. The location of the cross-section is not limited to these examples, and one of ordinary skill may select the cross section at other locations, if needed. In one example, an optical microscope or a scanning electron microscope (SEM) may be used in the measurement. Other methods and/or tools appreciated by one of ordinary skill in the art, even if not described in the present disclosure, may also be used.

When the metal layer 31 and the insulating layer 121 are implemented in the manner described above, the metal layer 31 and the insulating layer 121 may have the same thickness. Here, the thickness of the metal layer 31 may refer to any one or both of a thickness t2 of the metal layer 31 measured in a first direction (an X direction) or a thickness t3 of the metal layer 31 measured in a third direction (a Z direction). The thickness t2 or t3 of the metal layer 31 may be an average thickness, and may be measured in the same manner as the insulating layer 121.

In the present exemplary embodiment, the metal layer 31 may be formed to be relatively thin, and accordingly, the insulating layer 112 may also be formed to be thin. In order to thinly and compactly form the metal layer 31, atomic layer deposition may be used. When the metal layer 31 is formed by an ALD process or the like, the metal layer 31 and the insulating layer 121 may be formed along a groove existing in the surface of the body 110, which will be described in more detail in a process diagram of FIG. 5.

The external electrodes 131 and 132 may further include an electrode layer 32 covering the metal layer 31, in addition to the metal layer 31. The electrode layer 32 may be a sintered electrode. Specifically, the electrode layer 32 may be formed by a method of preparing a material including a conductive metal as a paste and then applying the paste onto the metal layer 31, and examples of the conductive metal may include Ni, Cu, Pd, Au, or alloys thereof. In this case, the metal component of the metal layer 31 and a metal component of the electrode layer 32 may form an intermetallic compound layer (see I in a process diagram of FIG. 6), for example, a Cu—Ti compound layer. In the related art, such a sintered electrode has been generally employed as a base electrode, but in the present exemplary embodiment, the metal layer 31 having a thin film form may be first formed by the ALD process or the like, and the electrode layer 32 may be formed to cover the metal layer 31. As described later, the electrode layer 32 may perform a protective function so that the metal layer 31 is not oxidized when the insulating layer 112 is selectively oxidized. When the insulating layer 112 is formed by such selective oxidation, a structure in which an interface between the metal layer 31 and the insulating layer 112 is connected to one side surface of the electrode layer 32 may be obtained, as illustrated in FIG. 2.

A case where the electrode layer 32 is the sintered electrode obtained by firing Cu or the like has been described in the abovementioned exemplary embodiment, but the electrode layer 32 may also be a conductive resin electrode. When the electrode layer 32 is implemented in a form of the conductive resin electrode, mounting stability of the multilayer capacitor 100 in a case of mounting the multilayer capacitor 100 on a circuit board or the like may be improved. In addition, the electrode layer 32 may include both of the sintered electrode and the conductive resin electrode. Meanwhile, the external electrodes 131 and 132 may include a plating layer 33 disposed on the electrode layer 32 as an additional component. For example, the plating layer 33 may be implemented in a multilayer structure including Ni, Sn and the like.

A process of manufacturing the multilayer capacitor having the form described above, in particular, a process of forming the external electrode will hereinafter be mainly described, and a structural feature will be more clearly understood by the following description for a process. Process diagrams of FIGS. 4 through 7 have been illustrated on the basis of the cross-sectional view of FIG. 2 taken along I-I' of the multilayer capacitor.

Figure 4:
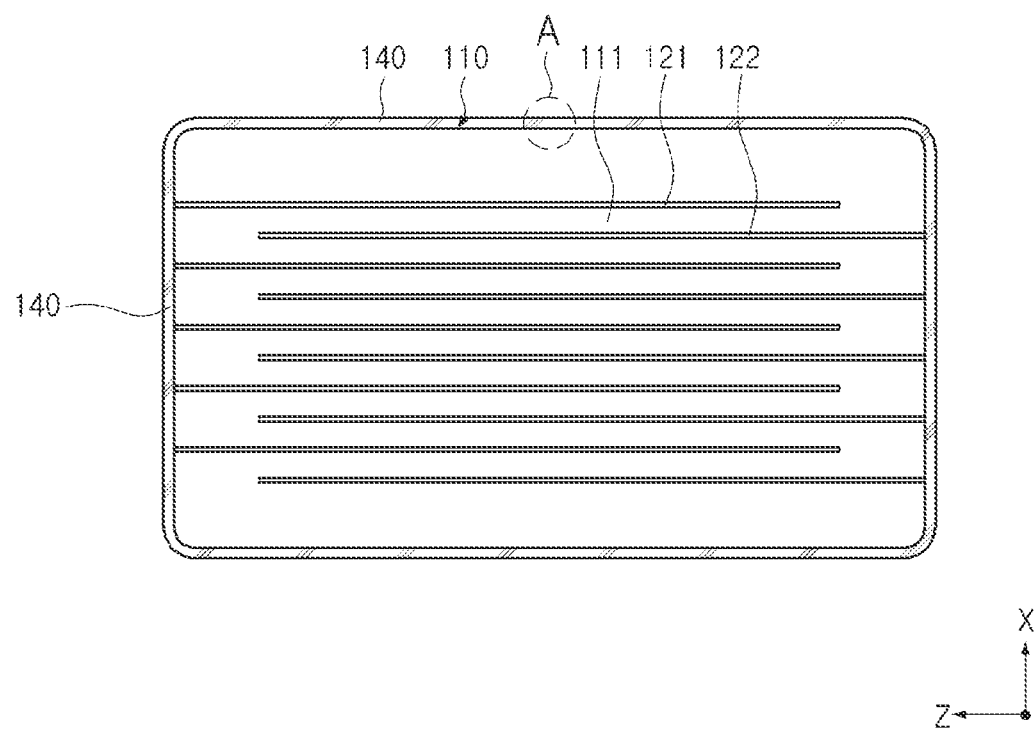
FIGS. 4 through 7 are views illustrating an example of a method of manufacturing the multilayer capacitor of FIG. 1.

As illustrated in FIG. 4, a metal layer 140 may be formed on the body 110. Here, the body 100 may be obtained in a form of a ceramic laminate by stacking the dielectric layers 111 and the internal electrodes 121 and 122. The dielectric layer 111 may be in a state of a ceramic green sheet because it is before being sintered, and the ceramic green sheet may be manufactured by mixing ceramic powders, a binder, a solvent, and the like, with each other to prepare slurry and manufacturing the slurry in a sheet shape having a thickness of several micrometers by a doctor blade method. Then, the ceramic green sheet may be sintered to form the dielectric layer 111. A conductive paste for an internal electrode may be applied onto the ceramic green sheets to form the internal electrodes 121 and 122 having a pattern form on the ceramic green sheet. In this case, the internal electrode 121 may be formed by a screen printing method or a gravure printing method. The conductive paste for an internal electrode may include a conductive metal and an additive. The additive may be one or more of a non-metal and a metal oxide. The conductive metal may include nickel. The additive may include barium titanate or strontium titanate as the metal oxide.

Figure 5:
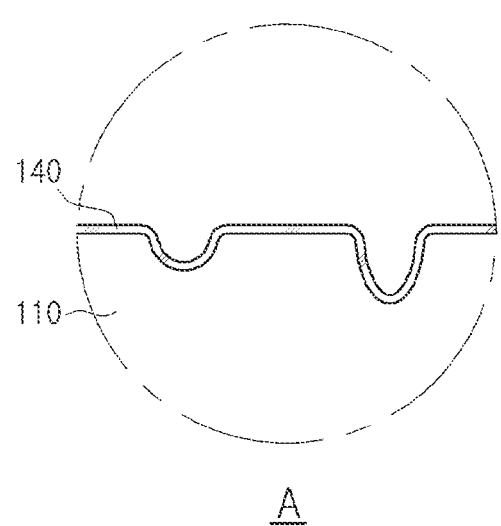

The metal layer 140 may be formed of a valve metal, which is a metal component of which oxidation occurs well and which is capable of becoming a compact oxide film when the oxidation occurs, and may include, for example, Ti, Al, V, Y, Zr, Nb, Hf, Ta, or the like. The metal layer 140 may be formed by an ALD process, and may cover the entire surface of the body 110. In this case, the metal layer 140 may be formed to be thin and compact, and may be formed to follow a surface of a groove formed in the surface of the body 110 along the groove, as illustrated in FIG. 5. In a subsequent process, when a portion of the metal layer 140 is oxidized to become the insulating layer 112, the insulating layer 112 may also be obtained in a form in which it follows the surface of the groove, and the same will apply to the remaining region of the metal layer 140, that is, the metal layer 31. The groove of the body 110 may be a permeation path of a plating solution, moisture or the like, but the insulating layer 112 may coat the groove in a conformal form as in the present exemplary embodiment to effectively reduce an influence from such a plating solution or moisture.

Figure 6:
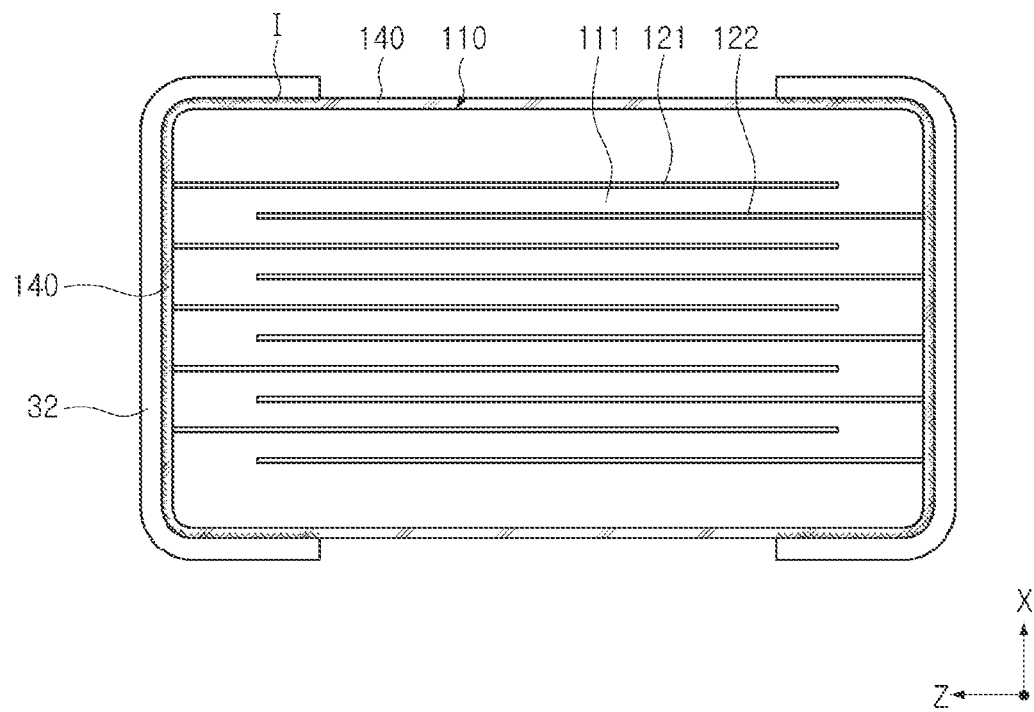

Then, as illustrated in FIG. 6, the electrode layer 32 may be formed to cover a portion of the metal layer 140 and expose a portion of the metal layer 140. To this end, a conductive paste may be partially applied on the metal layer 140. An intermetallic compound layer I may be formed on an interface between the metal layer 140 and the electrode layer 32 by a metal component (for example, Ti) of the metal layer 140 and a metal component (for example, Cu). The intermetallic compound layer I may be formed immediately after the electrode layer 32 is applied or may be formed in a subsequent firing or hardening process. FIG. 6 illustrates that the intermetallic compound layer I is formed inside the metal layer 140, but the intermetallic compound layer I may also be formed in the electrode layer 32. The intermetallic compound layer I is not illustrated in subsequent drawings, but may also remain in a final structure of the multilayer capacitor 100.

Figure 7:
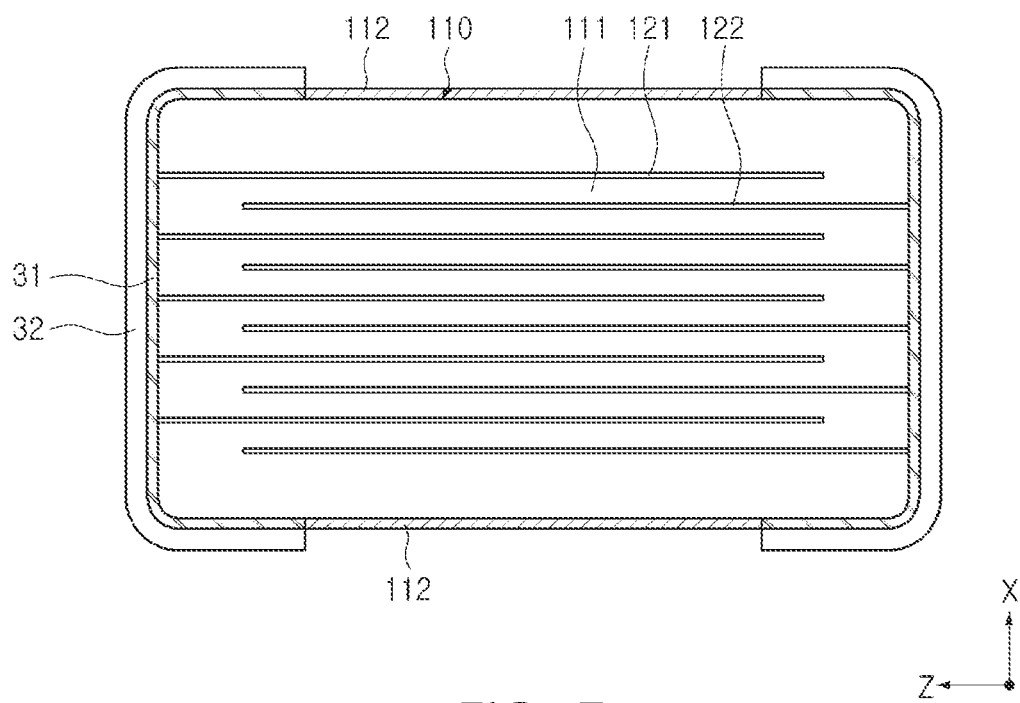

In a subsequent process, a partial region of the metal layer 140, that is, a region of the metal layer 140 exposed without being covered by the electrode layer 32 may be oxidized to become the insulating layer 112, and FIG. 7 illustrates a form in which the metal layer 140 is separated into the insulating layer 112 and a metal layer 31 remaining without being oxidized. Therefore, an interface between the metal layer 31 and the insulating layer 112 may be connected to one side surface of the electrode layer 32. The insulating layer 112 may be formed by naturally oxidizing the metal layer 140 or through an appropriate oxidation process of the metal layer 140. Alternatively, an anodizing process may be separately performed on the metal layer 140 to oxidize a partial region of the metal layer 140. In this case, the entire region of the metal layer 140 exposed without being covered by the electrode layer 32 does not need to be oxidized. In addition, no matter which oxidation manner is selected, the entire exposed region of the metal layer 140 does not need to be oxidized, and a non-oxidized metal component may remain in a portion of the insulating layer 112. Such a metal component may exist in an island form in the insulating layer 112. In addition, the metal layer 32 may have an oxidized region even though the oxidized region exists in a portion of the metal layer 32.

Figure 8:
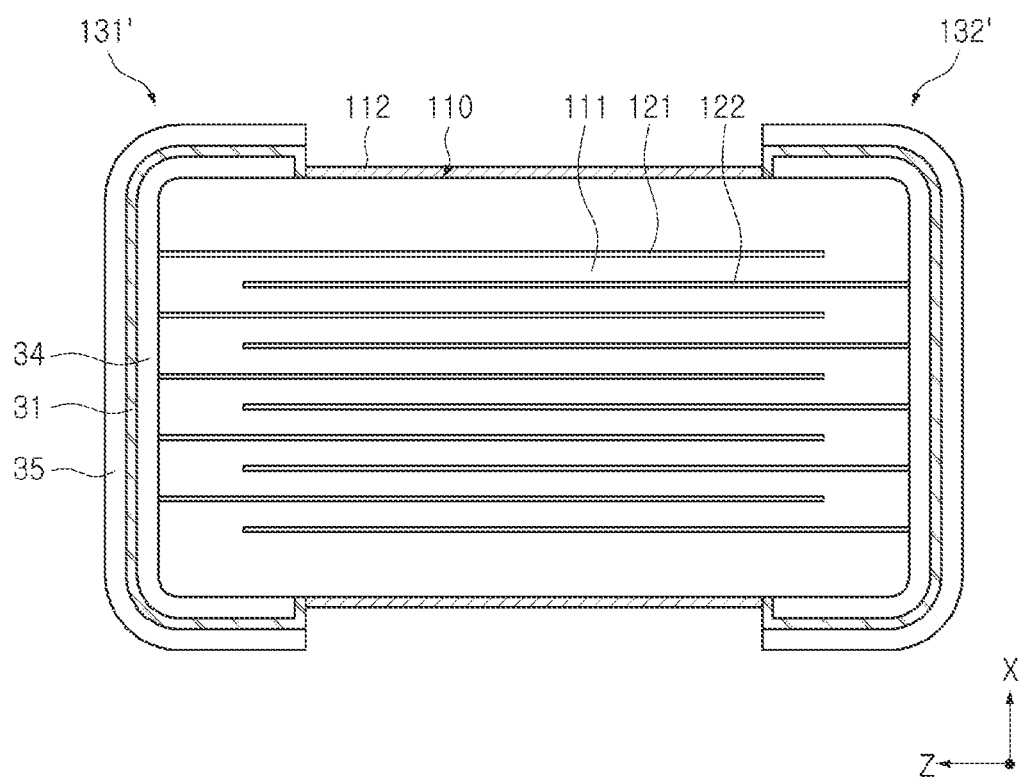
FIG. 8 is a cross-sectional view illustrating a multilayer capacitor according to a modified example.

A multilayer capacitor according to a modified example will be described with reference to FIG. 8, and only portions of external electrodes different from those of the multilayer capacitor according to the abovementioned exemplary embodiment will be described. In the present modified example, external electrodes 131' and 132' may further include an electrode layer 34 disposed between the metal layer 31 and the body 110. Here, the electrode layer 34 may be a base layer of the external electrodes 131' and 132', and may be formed by applying and then firing a conductive paste including Ni, Cu, Pd, Au, or the like. In addition, the electrode layer 34 may be thicker than the insulating layer 112.

Unlike the abovementioned exemplary embodiment, the metal layer 31 may be connected to the insulating layer 112 in a state in which it is formed on the electrode layer 34. Such a structure can be obtained by forming the insulating layer 112 integrally with the metal layer 31 and then selectively oxidizing the insulating layer 112, similar to the manner described above. In this case, as illustrated in FIG. 8, a portion of the metal layer 31 may be disposed between a side surface of the electrode layer 34 and the insulating layer 112. In addition, the metal layer 31 may cover a surface of the electrode layer 34 and may be bent along the surface of the electrode layer 34 to be connected to the insulating layer 112. The external electrodes 131' and 132' may further include an additional electrode layer 35 covering the metal layer 31. Here, the additional electrode layer 35 may be a sintered electrode or a conductive resin electrode. In addition, the additional electrode layer 35 may include both of the sintered electrode and the conductive resin electrode. In addition, intermetallic compound layers may be formed on an interface between the metal layer 31 and the electrode layer 34 and an interface between the metal layer 31 and the additional electrode layer 35 for the same reason as that described above.

Figure 9:
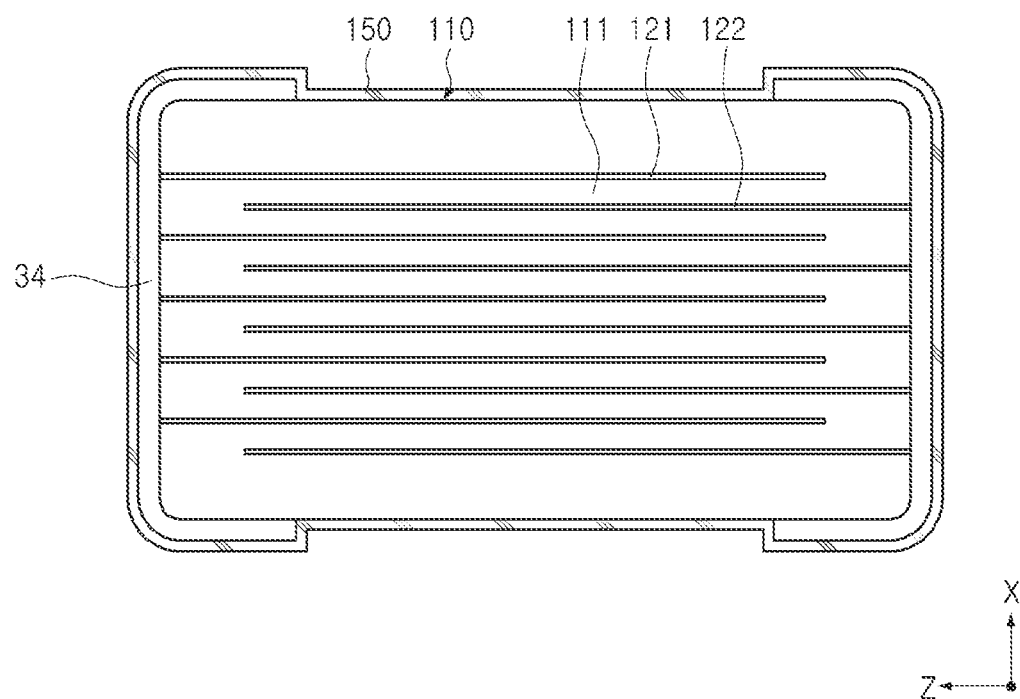
FIGS. 9 and 10 are views illustrating an example of a method of manufacturing the multilayer capacitor of FIG. 8.

A process of manufacturing the multilayer capacitor having the structure of FIG. 8 will be described with reference to FIGS. 9 and 10. Referring to FIG. 9, the electrode layer 34 may be first formed to cover the body 110, and the metal layer 150 may be then formed to cover the body 110 and the electrode layer 34 as a whole. The metal layer 150 may be formed in a thin film shape, and may be formed while following a surface of the electrode layer 34 and a surface of the body 110. To this end, as in the abovementioned exemplary embodiment, the metal layer 150 may be formed by an ALD process. In this case, an intermetallic compound layer may be formed by a metal component of the metal layer 150 and a metal component of the electrode layer 34 in a region of the metal layer 150 connected to the electrode layer 34.

Figure 10:
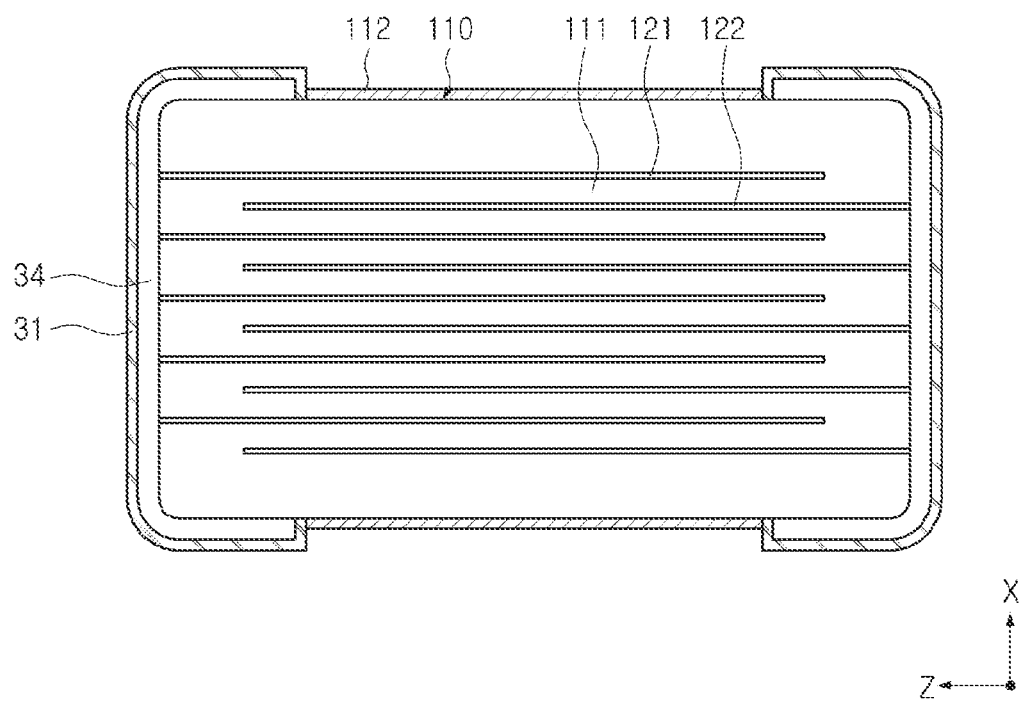

FIG. 10 illustrates a form in which the metal layer 150 is partially oxidized to be separated into the metal layer 31 and the insulating layer 112. This process may be performed in a state in which the electrode layer 35 does not exist. The reason is that the intermetallic compound layer (for example, a Cu—Ti compound layer) is formed by the metal component of the metal layer 150 and the metal component of the electrode layer 34 in the region of the metal layer 150 connected to the electrode layer 34, as described above, such that oxidation does not substantially occur in the region of the metal layer 150 connected to the electrode layer 34. Alternatively, a region of the metal layer 150 that is not in contact with the electrode layer 34 may become the insulating layer 112 by natural oxidation or a subsequent oxidation process. However, unlike a form illustrated in FIG. 10, the present oxidation process may also be performed after the electrode layer 35 is formed on the metal layer 150.

As set forth above, according to an exemplary embodiment in the present disclosure, moisture resistance reliability of the multilayer capacitor may be improved. In addition, an increase in a size of the multilayer capacitor in a case of using an insulating layer in order to improve the moisture resistance reliability may be significantly suppressed.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including a stack structure in which a plurality of dielectric layers are stacked and a plurality of internal electrodes stacked with respective dielectric layers interposed therebetween;
external electrodes disposed on external surfaces of the body and connected to the internal electrodes; and
an insulating layer covering a surface of the body,
wherein one of the external electrodes includes a metal layer connected to the insulating layer,
the insulating layer includes an oxide of a metal component of the metal layer,
the one of the external electrodes further includes an electrode layer covering the metal layer, and
the electrode layer includes one of a sintered electrode and a conductive resin electrode.

2. The multilayer capacitor of claim 1, wherein the metal layer covers the surface of the body, and has a side surface connected to a side surface of the insulating layer.

3. The multilayer capacitor of claim 1, wherein the metal layer and the insulating layer have the same thickness.

4. The multilayer capacitor of claim 1, wherein a thickness of the insulating layer is 5 nm to 1 µm.

5. The multilayer capacitor of claim 1, wherein the metal layer includes a material selected from the group consisting of Ti, Al, V, Y, Zr, Nb, Hf, and Ta.

6. The multilayer capacitor of claim 1, wherein the insulating layer is also disposed in a groove in the surface of the body.

7. A multilayer capacitor comprising:
a body including a stack structure in which a plurality of dielectric layers are stacked and a plurality of internal electrodes stacked with respective dielectric layers interposed therebetween;
external electrodes disposed on external surfaces of the body and connected to the internal electrodes; and
an insulating layer covering a surface of the body,
wherein one of the external electrodes includes a metal layer connected to the insulating layer,
the insulating layer includes an oxide of a metal component of the metal layer, and
the one of the external electrodes further includes an electrode layer disposed between the metal layer and the body.

8. The multilayer capacitor of claim 7, wherein the electrode layer is thicker than the insulating layer.

9. The multilayer capacitor of claim 7, wherein a portion of the metal layer is disposed between a side surface of the electrode layer and the insulating layer.

10. The multilayer capacitor of claim 7, wherein the metal layer covers a surface of the electrode layer and is bent along the surface of the electrode layer to be connected to the insulating layer.

11. The multilayer capacitor of claim 7, wherein the one of the external electrodes further includes an additional electrode layer covering the metal layer.

12. The multilayer capacitor of claim 11, wherein the additional electrode layer includes a sintered electrode.

13. The multilayer capacitor of claim 11, wherein the additional electrode layer includes a conductive resin electrode.

14. The multilayer capacitor of claim 11, wherein the electrode layer includes a sintered electrode.

15. The multilayer capacitor of claim 7, wherein the metal layer and the insulating layer have the same thickness.

16. The multilayer capacitor of claim 7, wherein the metal layer includes a material selected from the group consisting of Ti, Al, V, Y, Zr, Nb, Hf, and Ta.

17. The multilayer capacitor of claim 7, wherein the insulating layer is also disposed in a groove in the surface of the body.

18. A multilayer capacitor comprising:
a body including dielectric layers and internal electrodes alternately stacked;
an external electrode disposed on an external surface of the body and connected to one or more of the internal electrodes; and
an insulating layer covering a surface of the body,
wherein the external electrode includes a conductive layer, and
the insulating layer includes an oxide of a metal component included in the conductive layer,
the external electrode further includes an electrode layer covering the conductive layer,
the insulating layer is exposed from the electrode layer,
the electrode layer includes one of a sintered electrode and a conductive resin electrode.

19. The multilayer capacitor of claim 18, wherein the body is in contact with the conductive layer and the insulating layer.

20. The multilayer capacitor of claim 18, wherein the metal component of the conductive layer and a metal component of the electrode layer form an intermetallic compound layer.

21. The multilayer capacitor of claim 18, wherein the conductive layer includes a material selected from the group consisting of Ti, Al, V, Y, Zr, Nb, Hf, and Ta.

22. A multilayer capacitor comprising:
a body including dielectric layers and internal electrodes alternately stacked;
an external electrode disposed on an external surface of the body and connected to one or more of the internal electrodes; and
an insulating layer covering a surface of the body,
wherein the external electrode includes a conductive layer and an electrode layer disposed between the conductive layer and the body, and
the insulating layer includes an oxide of a metal component included in the conductive layer.

23. The multilayer capacitor of claim 22, wherein the external electrode further includes an additional electrode layer covering the conductive layer.

24. The multilayer capacitor of claim 23, wherein the additional electrode layer includes one of a sintered electrode and a conductive resin electrode.

25. The multilayer capacitor of claim 22, wherein the conductive layer includes a material selected from the group consisting of Ti, Al, V, Y, Zr, Nb, Hf, and Ta.

26. A method of manufacturing a multilayer capacitor, the method comprising:
forming a body including dielectric layers and internal electrodes alternately stacked;
forming a metal layer covering a surface of the body;
forming an electrode layer on a portion of the metal layer to cover one or more ends of the internal electrodes; and
forming an insulating layer by oxidizing another portion of the metal layer exposed from the electrode layer, wherein the multilayer capacitor includes the insulating layer.

27. The method of claim 26, wherein the metal layer is formed by an atomic layer deposition (ALD) process.

28. The method of claim 27, wherein the another portion of the metal layer exposed from the electrode layer is formed directly on the body.

29. The method of claim 28, wherein the portion of the metal layer covered by the electrode layer is formed directly on the body.

30. The method of claim 28, further comprising forming another electrode layer to connect to the one or more ends of the internal electrodes, prior to forming the metal layer, wherein the portion of the metal layer covered by the electrode layer is disposed between the another electrode layer and the electrode layer.

31. The method of claim 26, wherein the metal layer includes a material selected from the group consisting of Ti, Al, V, Y, Zr, Nb, Hf, and Ta.

32. A multilayer capacitor comprising:
a body including a stack structure in which a plurality of dielectric layers are stacked and a plurality of internal electrodes stacked with respective dielectric layers interposed therebetween;
external electrodes disposed on external surfaces of the body and connected to the internal electrodes; and
an insulating layer covering a surface of the body,
wherein one of the external electrodes includes a metal layer connected to the insulating layer,
the insulating layer includes an oxide of a metal component of the metal layer,
the one of the external electrodes further includes an electrode layer, and
the metal component of the metal layer and a metal component of the electrode layer form an intermetallic compound layer.

* * * * *